United States Patent
Lee

(10) Patent No.: US 9,824,590 B2
(45) Date of Patent: Nov. 21, 2017

(54) LANE DEPARTURE WARNING SYSTEM AND METHOD FOR CONTROLLING THE SAME

(71) Applicant: HYUNDAI MOTOR COMPANY, Seoul (KR)

(72) Inventor: Jong Bok Lee, Suwon-si (KR)

(73) Assignee: Hyundai Motor Company, Seoul (KR)

(*) Notice: Subject to any disclaimer, the term of this patent is extended or adjusted under 35 U.S.C. 154(b) by 180 days.

(21) Appl. No.: 14/699,825

(22) Filed: Apr. 29, 2015

(65) Prior Publication Data

US 2016/0111005 A1    Apr. 21, 2016

(30) Foreign Application Priority Data

Oct. 15, 2014 (KR) .................. 10-2014-0138930

(51) Int. Cl.
| | |
|---|---|
| H04N 7/18 | (2006.01) |
| G08G 1/16 | (2006.01) |
| G06K 9/00 | (2006.01) |
| B60K 35/00 | (2006.01) |

(52) U.S. Cl.
CPC ............. *G08G 1/167* (2013.01); *B60K 35/00* (2013.01); *G06K 9/00798* (2013.01); *B60K 2350/1028* (2013.01)

(58) Field of Classification Search
CPC .................... G08G 1/167; B60K 35/00; B60K 2350/1028; G06K 9/00798
USPC .................. 348/148; 340/438, 435; 345/174; 180/271
See application file for complete search history.

(56) References Cited

U.S. PATENT DOCUMENTS

| | | | |
|---|---|---|---|
| 8,698,639 B2 | 4/2014 | Fung et al. | |
| 2009/0195372 A1* | 8/2009 | Aichi | G06F 3/0425 340/438 |
| 2012/0206252 A1* | 8/2012 | Sherony | B60W 30/12 340/438 |

(Continued)

FOREIGN PATENT DOCUMENTS

| | | |
|---|---|---|
| JP | 2006-018140 A | 1/2006 |
| JP | 2006-106254 A | 4/2006 |

(Continued)

*Primary Examiner* — Mohammed Rahaman
*Assistant Examiner* — Richard Carter
(74) *Attorney, Agent, or Firm* — McDermott Will & Emery LLP

(57) ABSTRACT

A lane departure warning system includes a front camera generating front image information of a vehicle. A speaker outputs a departure warning message, and a screen displays an image including user interface objects. A touch detector generates touch information by detecting a user's touch on the screen. A controller recognizes lanes at both sides of a current driving road by using the front image information, sets first and second warning lines based on the lanes, and controls the speaker to output the departure warning message if the vehicle reaches one of the first and second warning lines. The controller calculates a touch operation time by using the touch information and changes the first and second warning lines to third and fourth warning liens if the touch operation time is greater than a first reference time. A distance between the third and fourth warning lines is less than a distance between the first and second warning lines.

16 Claims, 4 Drawing Sheets

(56) References Cited

U.S. PATENT DOCUMENTS

| | | | |
|---|---|---|---|
| 2012/0320210 A1* | 12/2012 | Imai | B60W 30/12 |
| | | | 348/148 |
| 2013/0155240 A1* | 6/2013 | Mitsuta | B60R 1/00 |
| | | | 348/148 |
| 2014/0002656 A1* | 1/2014 | Woo | G08G 1/167 |
| | | | 348/148 |
| 2014/0176716 A1* | 6/2014 | Wallat | B62D 15/025 |
| | | | 348/148 |

FOREIGN PATENT DOCUMENTS

| | | |
|---|---|---|
| JP | 2008-514497 A | 5/2008 |
| JP | 2009-120013 A | 6/2009 |
| KR | 10-2013-0051223 A | 5/2013 |
| KR | 10-2013-0064003 A | 6/2013 |

\* cited by examiner

LANE DEPARTURE WARNING SYSTEM AND METHOD FOR CONTROLLING THE SAME

CROSS-REFERENCE TO RELATED APPLICATION

This application claims the benefit of priority to Korean Patent Application No. 10-2014-0138930 filed in the Korean Intellectual Property Office on Oct. 15, 2014, the entire content of which is incorporated herein by reference.

TECHNICAL FIELD

The present disclosure relates to a lane departure warning system and a method for controlling the system. More particularly, the present disclosure relates to a lane departure warning system and a method for controlling the system for changing warning lines, which are references for outputting a departure warning message, based on a touch operation time.

BACKGROUND

A lane departure warning system (LDWS) outputs a departure warning message if it is anticipated that a vehicle is departing from a current driving road, thus improving safety of a driver in a situation such as drowsiness driving or fatigue driving.

Many vehicles are provided with a display apparatus such as a dashboard having a touch screen function. A screen size of the display apparatus has been increased over the years. Accordingly, many selectable (touchable) user interface objects are simultaneously displayed on the screen, and the driver controls various electronic devices (e.g., a navigation device, an audio device, and an air conditioner) through a touch.

When controlling the electronic devices through the touch screen, the driver has to look at the screen to control the various electronic devices which may cause the vehicle departing from a current driving road. Further, the driver use his/her one hand to hold a steering wheel when controlling the electronic devices the touch screen. In this instance, even though the driver is notified with a departure warning message, the vehicle may have already departed from the current driving road.

Accordingly, there is a need for a method of outputting the departure warning message at an appropriate time in order to prevent the vehicle from departing from the current driving road when the driver controls the electronic devices through the touch.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a lane departure warning system and a method for controlling the system capable of changing warning lines, which are references for outputting a departure warning message, based on a touch operation time.

A lane departure warning system according to an exemplary embodiment of the present inventive concept may include a front camera configured to generate front image information by photographing a front view of a vehicle. A speaker is configured to output a departure warning message. A screen is configured to display an image including a plurality of user interface objects. A touch detector is configured to generate touch information by detecting a user's touch on the screen. A controller is configured to recognize lanes at both sides of a current driving road by using the front image information, to set first and second warning lines based on the lanes, and to control the speaker to output the departure warning message if the vehicle reaches one of the first and second warning lines. The controller calculates a touch operation time by using the touch information and changes the first and second warning lines to third and fourth warning lines if the touch operation time is greater than a first reference time. A distance between the third and fourth warning lines is less than a distance between the first and second warning lines.

The controller may change the third and fourth warning lines to fifth and sixth warning lines if the touch operation time is greater than a second reference time, and the second reference time is greater than the first reference time. A distance between the fifth and sixth warning lines is less than the distance between the third and fourth warning lines.

The controller may change the first and second warning lines to the third and fourth warning lines if a user interface object is selected.

The controller may modify a form of the user interface object displayed on the screen if the first and second warning lines are changed to the third and fourth warning lines.

The touch detector may include an infrared illuminator configured to output infrared rays onto the screen and an infrared camera configured to photograph infrared rays reflected from the screen.

The screen may have a curved surface depending on a shape of a dashboard of the vehicle.

The system may further include a projector configured to project the image including the user interface object. A first mirror is configured to reflect the image projected from the projector, and a second mirror is configured to reflect the image reflected from the first mirror.

The first mirror may be an aspherical mirror manufactured depending on a curvature value of the screen.

A method for controlling a lane departure warning system according to another exemplary embodiment of the present inventive concept may include receiving front image information generated by a front camera. Lanes at both sides of a current driving road are recognized by using the front image information, and first and second warning lines are set based on the recognized lanes. Touch information is generated by detecting a user's touch on a screen. A touch operation time is calculated by using the touch information. Whether or not the touch operation time is greater than a first reference time is determined. The first and second warning lines are changed to third and fourth warning lines if the touch operation time is greater than the first reference time. A distance between the third and fourth warning lines is less than a distance between the first and second warning lines.

The method may further include controlling a speaker to output a departure warning message if the vehicle reaches one of the third and fourth warning lines.

The method may further include determining whether the touch operation time is greater than a second reference time. The third and fourth warning lines are changed to fifth and sixth warning lines if the touch operation time is greater than the second reference time. The second reference time is greater than the first reference time, and a distance between the fifth and sixth warning lines is less than the distance between the third and fourth warning lines.

The method may further include changing the first and second warning lines to the third and fourth warning lines if a user interface object is selected.

The method may further include modifying a form of a user interface object displayed on the screen if the touch operation time is greater than the first reference time.

According to the present disclosure, the warning lines, which are references for outputting the departure warning message, can be appropriately changed based on the touch operation time.

DETAILED DESCRIPTION OF THE EMBODIMENTS

Figure 1:
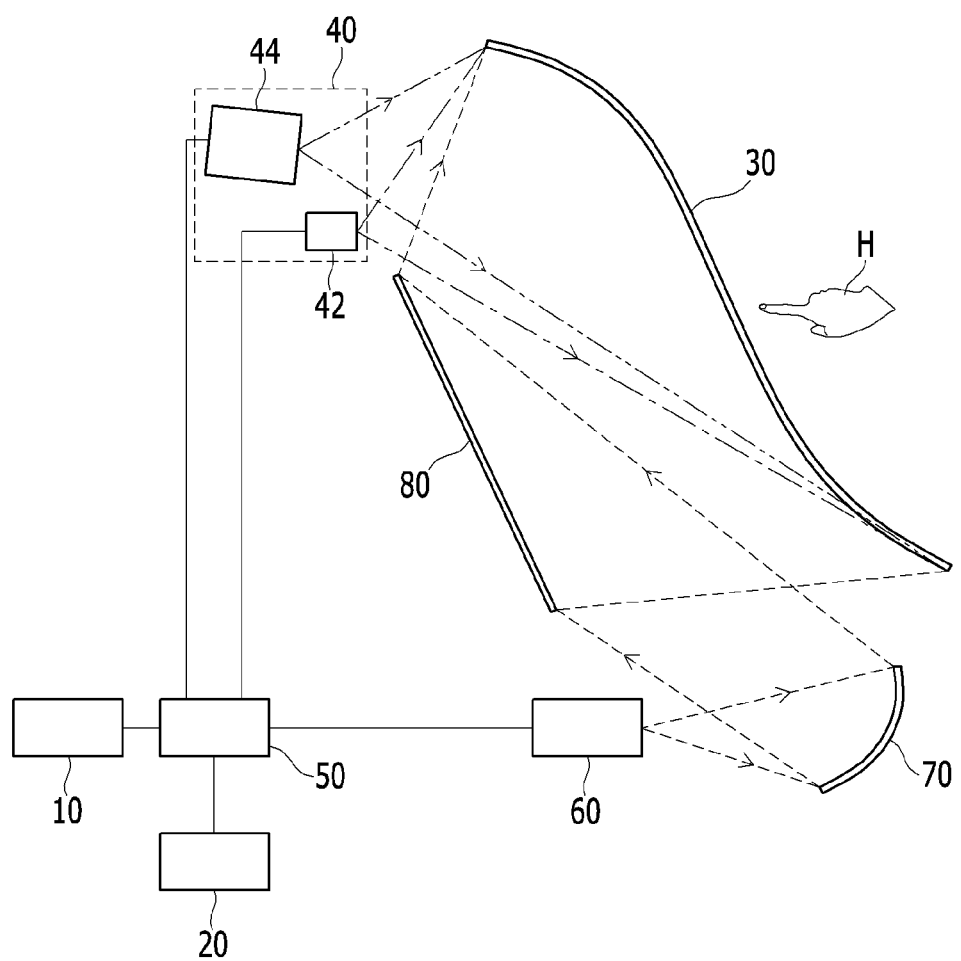
FIG. 1 is a schematic diagram of a lane departure warning system according to an exemplary embodiment of the present inventive concept.

The present disclosure will be described more fully hereinafter with reference to the accompanying drawings, in which exemplary embodiments of the inventive concept are shown. As those skilled in the art would realize, the described embodiments may be modified in various different ways, all without departing from the spirit or scope of the present disclosure.

Parts that are irrelevant to the description will be omitted to clearly describe the present disclosure, and the same or similar elements will be designated by the same reference numerals throughout the specification. Further, since each component shown in the drawings is arbitrarily illustrated for easy description, the present disclosure is not particularly limited to the components illustrated in the drawings.

Figure 2:
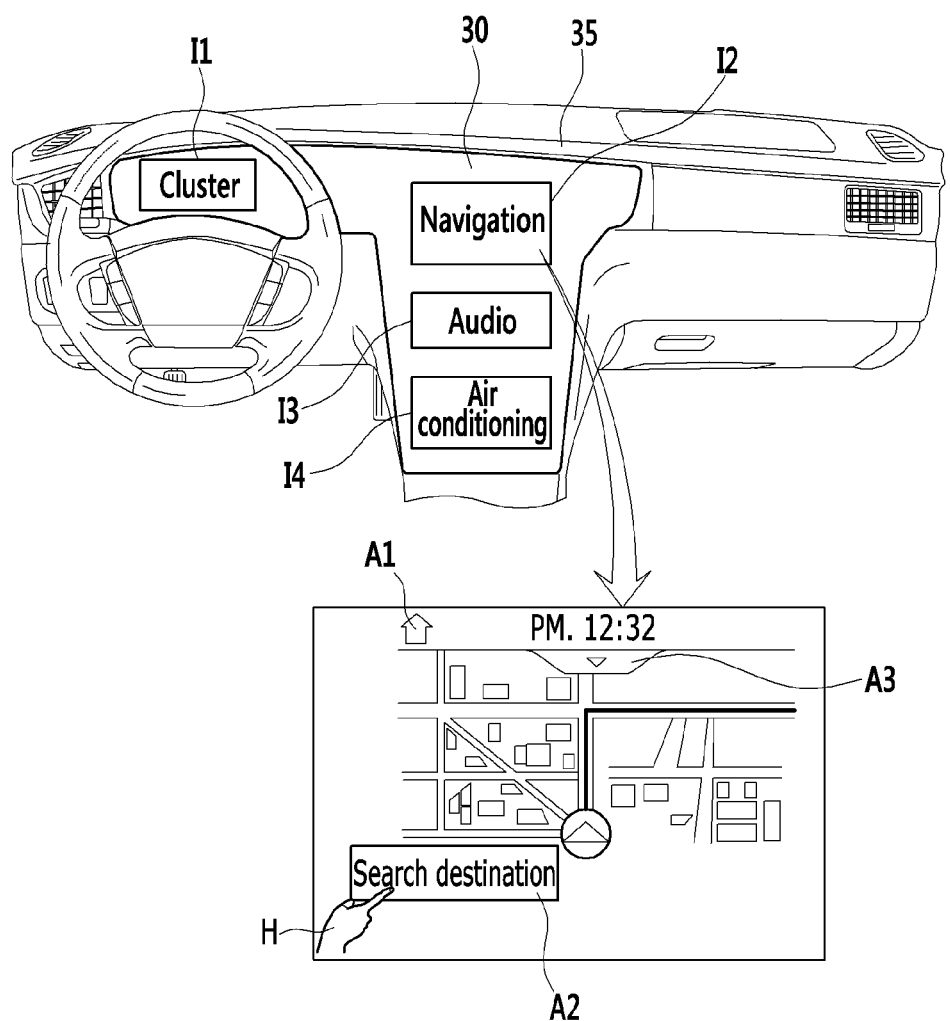
FIG. 2 is a drawing illustrating a screen according to an exemplary embodiment of the present inventive concept.

FIG. 1 is a schematic diagram of a lane departure warning system according to an exemplary embodiment of the present inventive concept, and FIG. 2 is a drawing illustrating a screen according to an exemplary embodiment of the present inventive concept.

As shown in FIGS. 1 and 2, a lane departure warning system according to an exemplary embodiment of the present inventive concept may include a front camera 10, a speaker 20, a screen 30, a touch detector 40, and a controller 50.

The front camera 10 generates front image information by photographing a front view of a vehicle. The front camera 10 may be mounted at a predetermined position inside or outside the vehicle so as to photograph lanes of a current driving road. The front image information is transmitted to the controller 50.

The speaker 20 outputs a departure warning message. A user such as a driver thus can recognize whether the vehicle is off from the current driving road through the departure warning message.

The screen 30 is disposed at a dashboard 35. The screen 30 may be formed with a curved surface depending on the shape of the dashboard 35. Selectable user interface objects A1, A2, and A3 may be displayed on the screen 30. For example, the user may touch the user interface object A2 so as to search a destination.

The user interface object refers to information that is selected and controlled by the user. For example, the user interface object may be an image, an icon, text, content, and a list.

The touch detector 40 generates touch information by detecting a user's touch on the screen 30, and then, the touch information is transmitted to the controller 50. The touch detector 40 may include an infrared illuminator 42 and an infrared camera 44. The infrared illuminator 42 outputs infrared rays onto the screen 30, and the infrared camera 44 photographs the infrared rays reflected from the screen 30.

The controller 50 is electrically connected to the front camera 10 and the touch detector 40, and may be implemented with one or more microprocessors executed by a predetermined program. The predetermined program may include a series of commands for performing each step included in a method for controlling the lane departure warning system according to an exemplary embodiment of the present inventive concept.

A projector 60 projects an image onto a predetermined projection area. The controller 50 may determine the image displayed on the screen 30 and control the projector 60 based on the determined image. The image is displayed on the screen 30 to be visually recognized by the user. The image may include cluster information I1, navigation information I2, audio information I3, and air conditioning information I4.

The cluster information I1 may include vehicle speed information, engine speed information, coolant temperature information, fuel level information, accumulated distance information, traveled distance information, operating state information of lamps (e.g., turn signal lamps or high beam lamps) operating state information of devices (e.g., doors, seat belts, or a battery), and the like.

The navigation information I2, the audio information I3, and the air conditioning information I4 may include a plurality of selectable user interface objects that correspond to various buttons and screens for operating a navigation device, an audio device, and an air conditioner.

The navigation information I2 may include a navigation menu configured with a plurality of user interface objects, a current position of the vehicle, route guidance on a map, and the like. The audio information I3 may include an audio menu configured with the plurality of user interface objects, volume, a sound source being currently played, a radio channel frequency, and the like. The air conditioning information I4 may include an air conditioning menu, current temperature, amount of airflow, and the like.

A first mirror 70 and a second mirror 80 may be disposed between the screen 30 and the projector 60. The image projected from the projector 60 may be reflected to the second mirror 80 via the first mirror 70. The image reflected from the second mirror 80 may be projected to the screen 30 and then displayed to the user.

The first mirror 70 may be an aspherical mirror manufactured depending on a curvature value of the screen 30. In addition, by using the first mirror 70, a path depth of light required for displaying the image on the screen 30 may be adjusted to reduce mounting spaces for mounting the projector 60, the first mirror 70, and the second mirror 80.

The image displayed by the projector 60 is indicated by dotted lines, an infrared illumination area is indicated by one-point chain lines, and a photographed area is indicated by two-point chain lines in FIG. 1.

When a user's hand H touches any point on the screen 30, infrared rays are reflected from the user's hand H. Then, the controller 50 determines a touch point by using touch information input from the touch detector 40. For example, the user may select a desired user interface object A2 among a plurality of user interface objects A1, A2, and A3. In this instance, the controller 50 may generate control commands to operate an application function (i.e., a destination search function) mapped to the selected user interface object A2, and output the control commands to a corresponding device (i.e., the navigation device). In addition, the controller 50 may calculate a touch operation time by using the touch information.

Hereinafter, a method for controlling a lane departure warning system according to an exemplary embodiment of the present inventive concept will be described in detail with reference to FIG. 3 and FIG. 4.

Figure 3:
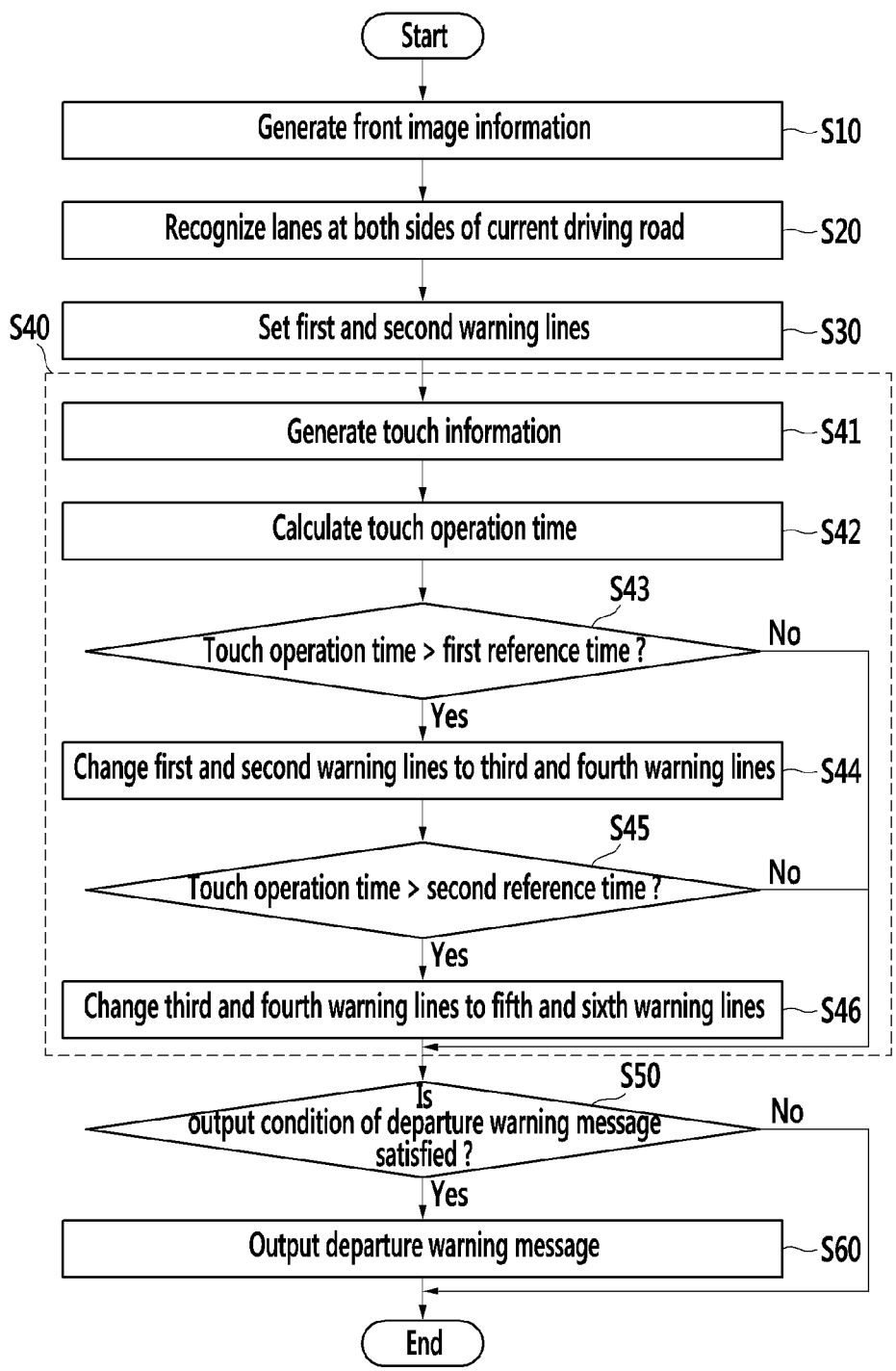
FIG. 3 is a flowchart of a method for controlling the lane departure warning system according to an exemplary embodiment of the present inventive concept.
Figure 4:
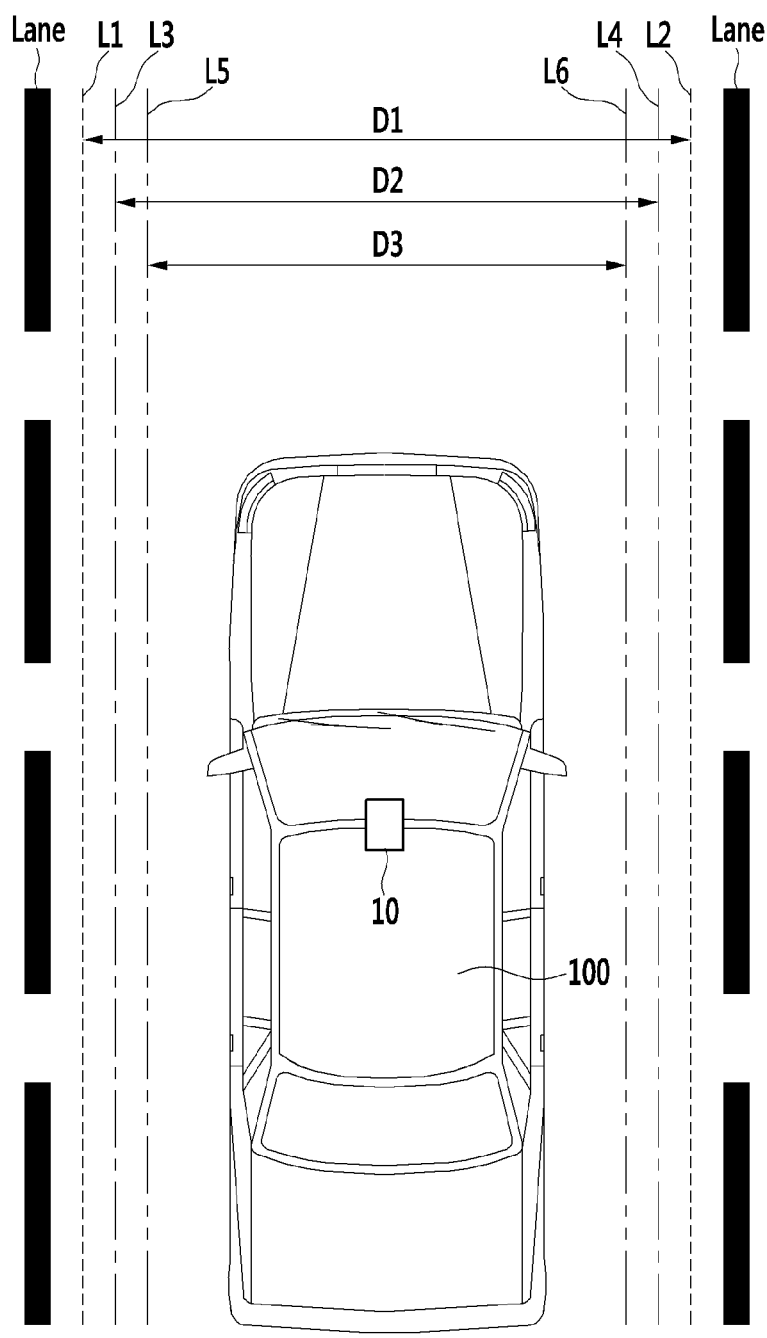
FIG. 4 is a drawing illustrating warning lines according to an exemplary embodiment of the present inventive concept.

FIG. 3 is a flowchart of a method for controlling a lane departure warning system according to an exemplary embodiment of the present inventive concept, and FIG. 4 is a drawing illustrating warning lines according to an exemplary embodiment of the present inventive concept.

As shown in FIG. 3 and FIG. 4, a method for controlling a lane departure warning sound system according to an exemplary embodiment of the present inventive concept includes generating front image information by photographing a front view of the vehicle 100 at step S10. Then, the front image information generated by the front camera 10 is transmitted to the controller 50.

The controller 50 recognizes lanes at both sides of a current driving road by using the front image information at step S20.

The controller 50 sets first and second warning lines L1 and L2 based on the lanes at step S30. According to a conventional lane departure warning system, the first and second warning lines L1 and L2 are fixed, and it is determined whether to output the departure warning message by using only the first and second warning lines L1 and L2. In contrast, the method for controlling the line departure warning system according to an exemplary embodiment of the present inventive concept may change warning lines (S40).

The touch detector 40 generates touch information by detecting a user's touch on the screen 30 at step S41. The touch information is transmitted to the controller 50.

The controller 50 calculates a touch operation time by using the touch information at step S42.

The controller 50 determines whether the touch operation time is greater than a first reference time at step S43. The first reference time may be set by a person of ordinary skill in the art in consideration of a situation in which the driver does not stare at a road in front of the vehicle 100.

If the touch operation time is less than or equal to the first reference time at step S43, the first and second warning lines L1 and L2 are maintained.

If the touch operation time is greater than the first reference time at step S43, the controller 50 changes the first and second warning lines L1 and L2 to third and fourth warning lines L3 and L4 at step S44. A distance D2 between the third and fourth warning lines L3 and L4 is less than a distance D1 between the first and second warning lines L1 and L2.

In addition, when a user interface object is selected, the controller 50 may change the first and second warning lines L1 and L2 to the third and fourth warning lines L3 and L4. For example, the selected user interface object may be the user interface A2 shown in FIG. 2. In this instance, if it is determined that the driver stares at the screen 30 to search a destination, the first and second warning lines L1 and L2 are changed to the third and fourth warning lines L3 and L4.

In addition, if the first and second warning lines L1 and L2 are changed to the third and fourth warning lines L3 and L4, the controller 50 may modify the form of the user interface object displayed on the screen 30. That is, the controller 50 may notify the driver by modifying the size or colors of the user interface object. For example, the user interface object A2 may be displayed to be red or to flicker.

If the touch operation time is greater than the first reference time, the controller 50 may determine whether the touch operation time is greater than a second reference time at step S45. The second reference time is greater than the first reference time.

If the touch operation time is less than or equal to the second reference time at step S45, the third and fourth warning lines L3 and L4 are maintained.

If the touch operation time is greater than the second reference time at step S45, the controller 50 changes the third and fourth warning lines L3 and L4 to fifth and sixth warning lines L5 and L6 at step S46. A distance D3 between the fifth and sixth warning lines L5 and L6 is less than the distance D2 between the third and fourth warning lines L3 and L4.

Then, the controller 50 determines whether an output condition of the departure warning message is satisfied at step S50. The output condition of the departure warning message may be satisfied if the vehicle 100 reaches one of the warning lines.

If the output condition of the departure warning message is satisfied at step S50, the controller 50 controls the speaker 20 to output the departure warning message at step S60.

As described above, the warning lines, which are references for outputting the departure warning message, can be appropriately changed based on the touch operation time.

While this inventive concept has been described in connection with what is presently considered to be practical exemplary embodiments, it is to be understood that the disclosure is not limited to the disclosed embodiments, but on the contrary, is intended to cover various modifications and equivalent arrangements included within the spirit and scope of the appended claims.

What is claimed is:

1. A lane departure warning system comprising:
   a front camera configured to generate front image information by photographing a front view of a vehicle;
   a speaker configured to output a departure warning message;
   a screen configured to display an image including a plurality of user interface objects;
   a touch detector configured to generate touch information by detecting a user's touch on the screen; and
   a controller configured to recognize lanes at both sides of a current driving road by using the front image information, to set first and second warning lines based on the recognized lanes, and to control the speaker to output the departure warning message if the vehicle reaches one of the first and second warning lines,
   wherein the controller calculates a touch operation time by using the touch information and changes the first and second warning lines to third and fourth warning lines if the touch operation time is greater than a first reference time, and
   wherein a distance between the third and fourth warning lines is less than a distance between the first and second warning lines.

2. The system of claim 1, wherein the controller changes the third and fourth warning lines to fifth and sixth warning lines if the touch operation time is greater than a second reference time,
   wherein the second reference time is greater than the first reference time, and
   wherein a distance between the fifth and sixth warning lines is less than the distance between the third and fourth warning lines.

3. The system of claim 1, wherein the controller changes the first and second warning lines to the third and fourth warning lines if a user interface object is selected.

4. The system of claim 1, wherein the controller modifies a form of the plurality of user interface objects displayed on the screen if the first and second warning lines are changed to the third and fourth warning lines.

5. The system of claim 1, wherein the touch detector includes an infrared illuminator configured to output infrared rays onto the screen and an infrared camera configured to photograph the infrared rays reflected from the screen.

6. The system of claim 1, wherein the screen has a curved surface according to a shape of a dashboard of the vehicle.

7. The system of claim 6, wherein the first mirror is an aspherical mirror manufactured depending on a curvature value of the screen.

8. The system of claim 1, further comprising:
   a projector configured to project the image including the plurality of user interface objects;
   a first mirror configured to reflect the image projected from the projector; and
   a second mirror configured to reflect the image reflected from the first mirror.

9. The system of claim 8, wherein the first mirror and the second mirror are disposed between the screen and projector.

10. The system of claim 1, wherein the image includes cluster information, navigation information, audio information, and air conditioning information.

11. The system of claim 10, wherein the cluster information includes vehicle speed information, engine speed information, coolant temperature information, fuel level information, accumulated distance information, traveled distance information, and operating state information of lamps,
   the navigation information includes a navigation menu having the plurality of user interface objects, a current position of the vehicle, and route guidance on a map,
   the audio information includes an audio menu having the plurality of user interface objects, volume, a sound source, and a radio channel frequency, and
   the air conditioning information includes an air conditioning menu, a current temperature, and the amount of airflow.

12. A method for controlling a lane departure warning system, the method comprising steps of:
   receiving front image information generated by a front camera;
   recognizing lanes at both sides of a current driving road by using the front image information and setting first and second warning lines based on the lanes;
   generating touch information by detecting a user's touch on a screen;
   calculating a touch operation time by using the touch information;
   determining whether the touch operation time is greater than a first reference time; and
   changing the first and second warning lines to third and fourth warning lines if the touch operation time is greater than the first reference time,
   wherein a distance between the third and fourth warning lines is less than a distance between the first and second warning lines.

13. The method of claim 12, further comprising a step of:
   controlling a speaker to output a departure warning message if the vehicle reaches one of the third and fourth warning lines.

14. The method of claim 12, further comprising steps of:
   determining whether the touch operation time is greater than a second reference time; and
   changing the third and fourth warning lines to fifth and sixth warning lines if the touch operation time is greater than the second reference time,
   wherein the second reference time is greater than the first reference time, and
   a distance between the fifth and sixth warning lines is less than the distance between the third and fourth warning lines.

15. The method of claim 12, further comprising a step of:
   changing the first and second warning lines to the third and fourth warning lines if a user interface object is selected.

16. The method of claim 12, further comprising a step of:
   modifying a form of a user interface object displayed on the screen if the touch operation time is greater than the first reference time.

* * * * *